United States Patent [19]

He

[11] Patent Number: 5,970,431
[45] Date of Patent: Oct. 19, 1999

[54] ICONIZED DMIS

[75] Inventor: Denny He, Diamond Bar, Calif.

[73] Assignee: International Metrology Systems, Inc., Livonia, Mich.

[21] Appl. No.: 08/843,766

[22] Filed: Apr. 21, 1997

[51] Int. Cl.[6] ............................. G06F 15/00; G06F 17/50
[52] U.S. Cl. .............. 702/152; 364/474.02; 364/474.15; 364/474.24; 706/919; 708/200
[58] Field of Search ...................... 364/559, 552, 364/474.02, 474.15, 474.24, 280.4, 280.7; 395/904, 600; 702/150–153, 155; 708/100, 200; 706/919

[56] References Cited

U.S. PATENT DOCUMENTS

| | | |
|---|---|---|
| 2,801,475 | 8/1957 | Meyer, Jr. . |
| 3,002,279 | 10/1961 | Miller . |
| 3,906,639 | 9/1975 | Wilamowski . |
| 3,942,253 | 3/1976 | Gebel et al. . |
| 4,128,943 | 12/1978 | Muhlethaler . |
| 4,729,174 | 3/1988 | Caron et al. ............................. 33/504 |
| 4,852,402 | 8/1989 | Bertz ........................................ 73/162 |
| 5,187,788 | 2/1993 | Marmelstein ......................... 395/900 |
| 5,198,990 | 3/1993 | Farzan et al. . |
| 5,465,221 | 11/1995 | Merat et al. ........................... 364/552 |

OTHER PUBLICATIONS

Kramer, T.R., et al., "NIST DMIS Interpreter", NTIS Order Number: PB97–167548/XAB; Product from NTIS; National Inst. of Standards and Technology (MEL) Apr. 1997.

An American National Standard—ANSI/ASME B89.1.12M–1985, pp. 9–13.

Primary Examiner—Kamini Shah
Attorney, Agent, or Firm—Patula & Associates

[57] ABSTRACT

An icon based DMIS program allows for simplified and enhanced use in a coordinate measurement machine environment. Each listed icon is associated with an underlying DMIS code. Double clicking on a DMIS icon will open a window which shows the underlying DMIS code for that icon, allowing changes to be made to that DMIS code. Both the Iconized DMIS list as well as the DMIS window allow for full editing capabilities such as deletions, insertions, change of numerical values and copy/paste facilities.

8 Claims, 7 Drawing Sheets

ICONIZED DMIS

The present invention relates to coordinate measurement and inspection methods and in particular coordinate measurement and inspection methods for use in association with a coordinate measurement machine, and specifically to a coordinate measurement and inspection method using a plurality of icons corresponding to and identifying DMIS code.

BACKGROUND OF THE INVENTION

Figure 1:
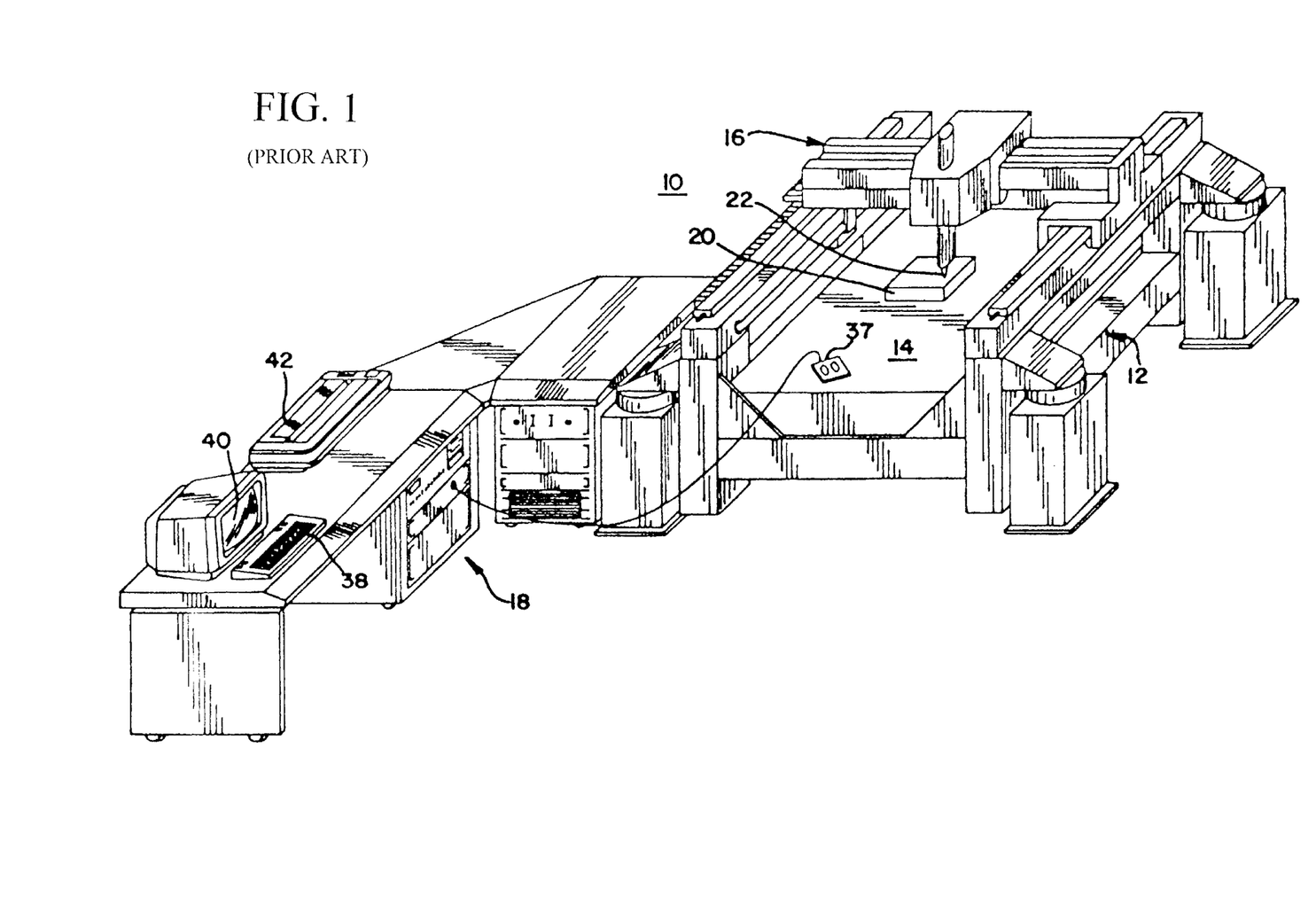
FIG. 1 is a prior art illustration of a coordinate measurement machine and operating environment thereof.

DMIS is a command line based CMM programming language for use with a coordinate measurement machine (CMM) and associated computer hardware and software used to measure and analyze an object. U.S. Pat. No. 5,198,990 issued to Farzan et al. on Mar. 30, 1993 discloses coordinate measurement and inspection methods and apparatus including the DMIS syntax, and is herein incorporated by reference. FIG. 1 of the '990 patent incorporated herein as prior art FIG. 1 illustrates a coordinate measurement machine environment including a frame assembly 12 having a reference table 14, a robotics unit 16 and a machine control unit 18. The coordinate measurement machine is used to measure or inspect an object 20 via a sensor or probe 22 mounted to robotics unit 16 and controlled via machine control unit 18. Machine control unit 18 is a computer system comprising a central processing unit, a hard drive, floppy disk and CD-ROM drives, and random access memory, and any other devices commonly associated with a computer system. Machine control unit 18 is operatively connected to a variety of computer accessories including a keyboard 38 and pointing device such as a mouse, a monitor 40, and a printer 42.

The machine control unit 18 is programmed to calculate dimensions and points on the object from the output signals of the probe and output signals from associated linear encoders, using the DMIS syntax. Difficulty with the widely used DMIS syntax has always been the recognition of the different commands from looking at a blur of code. That is, users of DMIS have had to learn and live with difficult to read and hard to edit and debug Part Inspection Programs. Accordingly, there is a need to simplify and enhance use of the widely used DMIS program.

BRIEF SUMMARY OF THE INVENTION

The present invention teaches visualized icon based DMIS programming language for a CMM. The present invention generates DMIS Icons (with underlying DMIS code) based on measurement operations performed by an operator or programmer. The present invention is intuitive and provides for a complete probe collision protection unheard of in the CMM Industry.

The DMIS icons clearly identify the DMIS code that is being generated and audio as well as video tools assist in every possible way to minimize programming time and maximize machine efficiency. Easy drag and drop functionally allows for operations that would normally require an intense knowledge of the DMIS language in order to perform simple tasks.

Accordingly, it is the principal object of the present invention to provide a simplified and enhanced method for using DMIS in a CMM environment.

It is a further object of the present invention to provide visualized icon based DMIS programming language for a CMM.

It is also an object of the present invention to provide in a DMIS program computer windows which display the DMIS code and allow parameters to be set therein.

Numerous other advantages and features of the present invention will become readily apparent from the detailed description of the preferred embodiment of the invention, from the claims, and from the accompanying drawings in which like numerals are employed to designate like parts throughout the same.

BRIEF DESCRIPTION OF THE DRAWINGS

A fuller understanding of the foregoing may be had by reference to the accompanying drawings wherein.

DETAILED DESCRIPTION OF THE PREFERRED EMBODIMENT OF THE PRESENT INVENTION

While the present invention is susceptible to embodiment in many different forms, there are shown in the drawings and will be described herein in detail, a preferred embodiment of the invention. It should be understood however that the present disclosures to be considered an exemplification of the principals of the invention and is not intended to limit the spirit and scope of the invention and/or claims of the embodiment illustrated.

Figure 2:
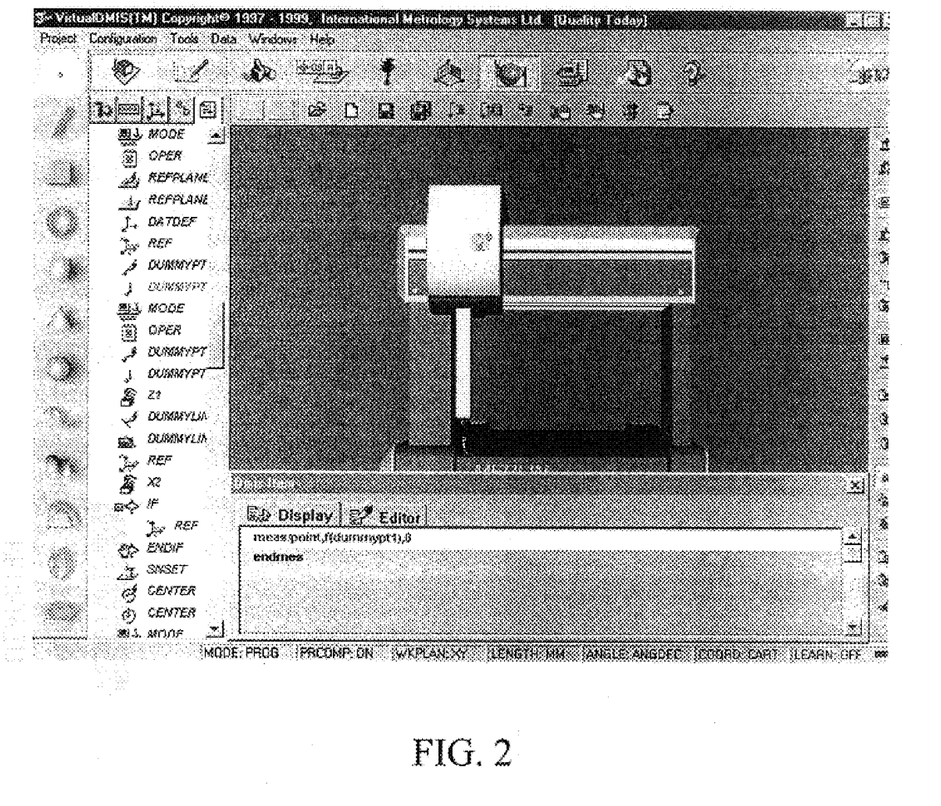
FIG. 2 is a screen capture of the main User Interface of Virtual DMIS.

Iconized DMIS is a novel approach and idea regarding DMIS. The application created around Iconized DMIS is named "Virtual DMIS" and uses Iconized DMIS as its core engine. FIG. 2 is a screen capture of the main User Interface of Virtual DMIS.

Each icon in the Iconized DMIS List immediately identifies the functionality of the underlying DMIS code. Should the user desire to take a closer look at the actual DMIS code, identified by a certain Icon, a double click of the left hand mouse button will bring open a DMIS item window. From within this DMIS item window, changes can be made to the actual DMIS code itself. Both the Iconized DMIS list as well as the DMIS window allow for full editing capabilities such as deletions, insertions, change of numerical values and copy/paste facilities.

Due to the fact that DMIS allows any label assignment to any feature, the Iconized DMIS list displays the feature's label directly adjacent to its icon for easy and quick recognition.

Figure 3:
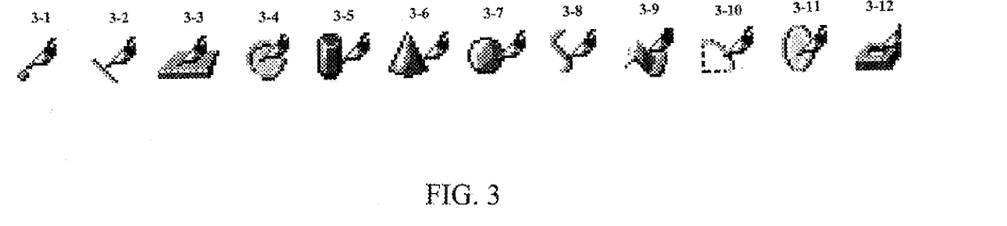
FIG. 3 illustrates examples of various DMIS icons representing feature definitions.

FIG. 3 illustrates examples of various DMIS icons representing feature definitions. The DMIS 3.0 specification defines that each and every Feature that is either to be measured, and/or constructed from existing features, must have a nominal definition prior to the actual measurement and/or construction. Historically this used to be referred to as "WRITING NOMINALS."

For that reason, the feature definition icons are illustrated as a pen and the representation of the Feature being defined.

The Feature Definition Icons in FIG. 3 therefore have the following meaning (from left to right):

3-1. Nominal POINT definition. Double clicking the Icon will show the DMIS in this form:

F(label)=FEAT/POINT, . . .

3-2. Nominal LINE definition. Double clicking the Icon will show the DMIS in this form:

F(label)=FEAT/LINE, . . .

3-3. Nominal PLANE definition. Double clicking the Icon will show the DMIS as follows:

F(label)=FEAT/PLANE, . . .

3-4. Nominal CIRCLE definition. Double clicking the Icon will show the DMIS in this form:

F(label)=FEAT/CIRCLE, . . .

3-5. Nominal CYLINDER definition. Double clicking the Icon will show the DMIS in this form:

F(label)=FEAT/CYLNDR, . . .

3-6. Nominal CONE definition. Double clicking the Icon will show the DMIS in this form:

F(label)=FEAT/CONE, . . .

3-7. Nominal SPHERE definition. Double clicking the Icon will show the DMIS in this form:

F(label)=FEAT/SPHERE, . . .

3-8. Nominal GENERAL CURVE definition. Double clicking the Icon will show the DMIS in this form:

F(label)=GCURVE, . . .

3-9. Nominal GENERAL SURFACE definition. Double clicking the Icon will show the DMIS in this form:

F(label)=FEAT/GSURF, . . .

3-10. Nominal ARC definition. Double clicking the Icon will show the DMIS in this form:

F(label)=FEAT/ARC, . . .

3-11. Nominal ELLIPS definition. Double clicking the Icon will show the DMIS in this form:

F(label)=FEAT/ELLIPS, . . .

3-12. Nominal SLOT definition. Double clicking the Icon will show the DMIS in this form:

F(label)=FEAT/SLOT, . . .

While the present invention illustrates twelve feature definition icons, it should be understood that any number of feature definition icons can be utilized as representing any number of features to be defined. Thus, generically for ANYFEATURE, it should be understood that an icon can be created for a Nominal ANYFEATURE definition whereby double clicking the Icon will show the DMIS in the form F(label)=FEAT/ANYFEATURE, . . .

Figure 4:
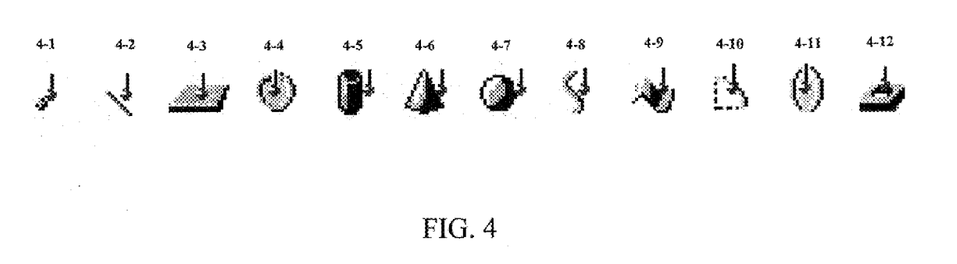
FIG. 4 illustrates examples of various DMIS icons representing feature measurements.

FIG. 4 illustrates examples of various DMIS icons representing feature measurements. When Features are to be measured, the measuring device of the CMM will approach the feature to be measured with a Sensor. This Sensor may be one of many different types—Laser Sensor, Touch Trigger Sensor, Capacitance Sensor, etc. The electro-mechanical touch trigger sensor or probe has become the most common device to be utilized for actual data collection and this type of sensor incorporates a stylus commonly recognized as a small diameter shank with an industrial ruby sphere on the end. Thus the icons used for the "MEASURE FEATURE" functions are illustrated as a touch trigger probe and the representation of the Feature being measured.

The Feature Measurement Icons in FIG. 4 therefore have the following meaning (from left to right):

| | | |
|---|---|---|
| 4-1. | POINT Measurement. | Double clicking the Icon will show the DMIS in this form:<br>MEAS/POINT,F(label),1<br>ENDMES |
| 4-2. | LINE Measurement. | Double clicking the Icon will show the DMIS in this form:<br>MEAS/LINE,F(label),2<br>ENDMES |
| 4-3. | PLANE Measurement. | Double clicking the Icon will show the DMIS in this form:<br>MEAS/PLANE,F(label),3<br>ENDMES |
| 4-4. | CIRCLE Measurement. | Double clicking the Icon will show the DMIS in this form:<br>MEAS/CIRCLE,F(label),3<br>ENDMES |
| 4-5. | CYLINDER Measurement. | Double clicking the Icon will show the DMIS in this form:<br>MEAS/CYLNDR,F(label),5<br>ENDMES |
| 4-6. | CONE Measurement. | Double clicking the Icon will show the DMIS in this form:<br>MEAS/CONE,F(label),2<br>ENDMES |
| 4-7. | SPHERE Measurement. | Double clicking the Icon will show the DMIS in this form:<br>MEAS/SPHERE.F(label),5<br>ENDMES |
| 4-8. | GENERAL CURVE Measurement. | Double clicking the Icon will show the DMIS in this form:<br>MEAS/GCURVE,F(label),160<br>ENDMES |
| 4-9. | GENERAL SURFACE Measurement. | Double clicking the Icon will show the DMIS in this form:<br>MEAS/GSURF,F(label),250<br>ENDMES |
| 4-10. | ARC Measurement. | Double clicking the Icon will show the DMIS in this form:<br>MEAS/ARC,F(label),3<br>ENDMES |
| 4-11. | ELLIPS Measurement. | Double clicking the Icon will show the DMIS in this form:<br>MEAS/ELLIPS,F(label),8<br>ENDMES |
| 4-12. | SLOT Measurement. | Double clicking the Icon will show the DMIS in this form:<br>MEAS/SLOT,F(label),9<br>ENDMES |

While the present invention illustrates twelve feature measurement icons, it should be understood that any number of feature measurement icons can be utilized as representing any number of features to be measured. Thus, generically for ANYFEATURE, it should be understood that an icon can be created for a ANYFEATURE measurement whereby double clicking the Icon will show the DMIS in the form:

MEAS/ANYFEATURE,F(label),(# of data points for the feature)

ENDMES.

Figure 5:
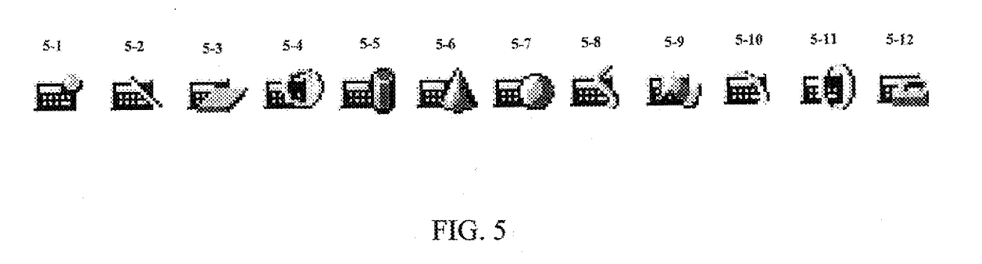
FIG. 5 illustrates examples of various DMIS icons representing feature constructions.

FIG. 5 illustrates examples of various DMIS icons representing feature constructions. The construction of features (such as intersections, projections, best-fit, etc.,) are mathematical calculations initiated via the application user interface based on the selections of the user. Thus, the feature construction icons are illustrated as a calculator along with the feature that is being constructed.

FIG. 5 illustrates twelve icons representing the following construction of features (from left to right):

| | |
|---|---|
| 5-1 | Point |
| 5-2 | Line |
| 5-3 | Plane |
| 5-4 | Circle |
| 5-5 | Cylinder |
| 5-6 | Cone |
| 5-7 | Sphere |
| 5-8 | General Curve |
| 5-9 | General Surface |
| 5-10 | Arc |
| 5-11 | Ellipse |
| 5-12 | Slot |

Due to the large number of feature construction methods permitted by DMIS, it is beyond the scope of this document to explicitly detail all the possible feature construction options. However, the example below illustrates typical underlying DMIS code for the construction Icons:

CONST/LINE,F(label),BF,FA(label),FA(label),F(label),¼¼.

Figure 6:
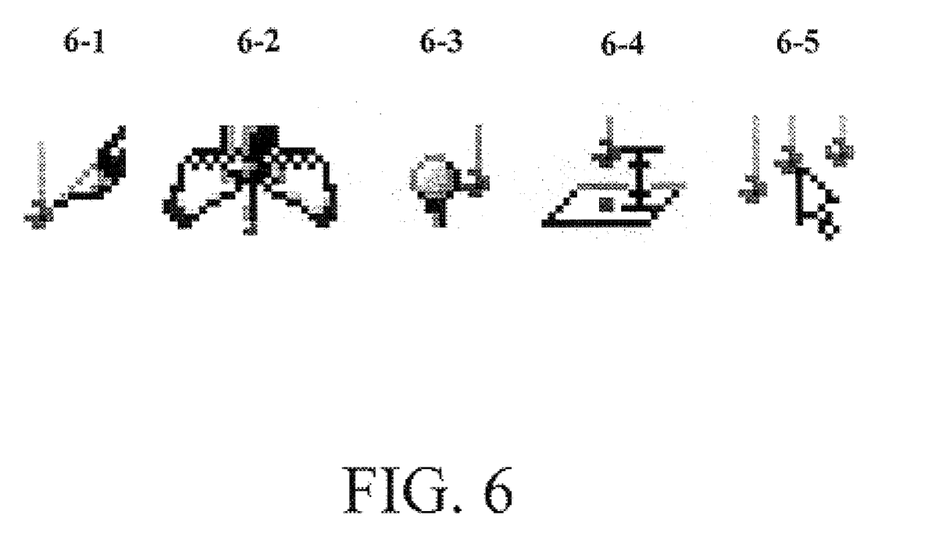
FIG. 6 illustrates examples of various DMIS icons representing sensor handling.

FIG. 6 illustrates examples of various DMIS icons representing sensor handling. As described above, the measuring device of the CMM requires some kind of sensor device to collect or trigger the measurement data. Associated with the use of sensors are many operations such as definition, calibration, selection, etc. The following is a description of the sensor handling icons shown in FIG. 6 which are used to represent the required functionality for a wide range of sensors.

6-1. Sensor Definition Icon:

DMIS requires that Sensors have a nominal definition prior to selection or calibration. For this reason, the icon representing the definition of a sensor includes both a pen, symbolizing the "WRITING" of a definition, and a representation of the ruby stylus.

The underlying DMIS for this Icon can be as follows:

S(label)=SNSDEF/PROBE, . . . or

S(label)=SNSDEF/VIDEO, . . . etc.

6-2. Sensor Mount Icon:

This Icon represents the 'mounting' of the sensor on the measuring device of the CMM. This process is required to establish the relationship of the sensor coordinate system in relation to the measuring device of the CMM. The DMIS term used to identify this operation is "Sensor Mount" or SNSMNT.

Below is an example of the underlying DMIS code:
SNSMNT/XVEC,0.00,1.00,0.00,ZVEC,0.00,0.00,0.00, MNTLEN,0.00,0.00,0 .00

6-3. Sensor Calibration Icon:

Sensors, such as Ruby Styli, Video systems or Lasers, require an accuracy verification. This process is known as sensor calibrations and involves the measurement of a known artifact. From the artifact measurement results, sensor calibration data such as position and size are determined. The most commonly used artifact is a Sphere, and as such a sphere is used in the sensor calibration icon. It should be noted that the calibration artifact is not limited to a Sphere and that many other artifacts may be used.

The underlying DMIS code looks like this:

CALIB/SENS,S(label),F(MGAGE),5

ENDMES 6-4. Sensor Settings Icon:

Sensor Settings represent the parameters with which a computer controlled measuring device moves around an object or part during the inspection process. The parameters determine the amount by which the sensor will clear the actual features to be measured on the part.

The underlying DMIS code looks like this:

| | |
|---|---|
| Approach distance | SNSET/APPRCH,10 |
| Retract Distance | SNSET/RETRCT,10 |
| Surface clearance | SNSET/CLRSRF,100 |
| Measurement depth | SNSET/DEPTH,4 |
| Search distance | SNSET/SEARCH,25 |

6-5. Sensor Select Icon:

At anytime during the creation of a measurement sequence, the type and configuration of the Sensor may be altered. Prior to this selection process the required sensor must have been previously defined. The Sensor Select icon allows the change of Sensor anytime during the inspection process. The Sensor Select Icon is illustrated as a mouse cursor making a selection from a list of available sensors. While five sensor handling icons are illustrated, it should be understood that any number of icons can be utilized to correspond to any number of sensor handling operations or functions.

Figure 7:
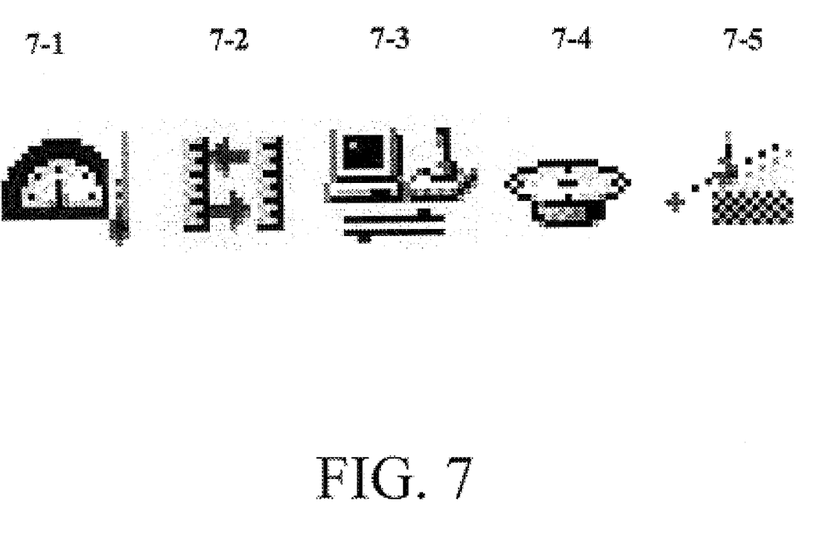
FIG. 7 illustrates examples of various DMIS icons representing measuring device parameters.

FIG. 7 illustrates examples of various DMIS icons representing measuring device parameters. Associated with any measuring device are a range of system parameters such as measuring units, operating mode, etc.

The measuring device parameters icons illustrated in FIG. 7 represent the following DMIS functions:

7-1. Probe Compensation Icon:

When a sensor such as a ruby ball stylus is used, the measured data is with respect to the ball center and the system has to compensate measured data to the actual contact point between the ball and the surface of the part. For this type of sensor the probe compensation must be ON, but other sensor types such as triangulation lasers the compensation must be set to OFF. Selection of this icon turns the compensation on or off.

The underlying DMIS code looks like this:

| | |
|---|---|
| COMPENSATION ON | PRCOMP/ON |
| COMPENSATION OFF | PRCOMP/OFF |

7-2. Units of Measurement Icon:

The majority of measuring devices of the CMM permit the selection of measurement units such as Inches, Millimeters, Decimal Angles, etc. The selection of units supported by DMIS are:

Length:—Millimeters, Inches, Centimeters, Meters, Feet.

Angular:—Decimal degrees, Radians, Degrees minutes and seconds.

Selection of this icon allows a user to readily switch to the desired measurement units. Typical underlying DMIS code looks like this:

| | |
|---|---|
| Millimeters and decimal angles | UNITS/MM,ANGDEC |
| Inches and radians | UNITS/INCH,ANGRAD |

7-3. Mode of Operation Icon:

The modes of operation supported by DMIS are Manual, Program and Automatic, referring to the path in which the sensor will move. The application of this function is dependent on the type of measuring device being used. Whilst manual mode is self explanatory, the difference between Program and Automatic mode is that when in Program mode the measuring device will follow a sensor path that has been programmed by the operator and in automatic mode the system determines the sensor path.

The underlying DMIS code looks like this:

| Manual mode | MODE/MAN |
|---|---|
| Program mode | MODE/PROG,MAN |
| Automatic mode | MODE/AUTO,PROG,MAN |

Two additional icons (7-4, 7-5) are illustrated and can correspond to any system parameter of the measuring device, for example speed (velocity and acceleration), etc. It should be understood that any number of icons can be utilized to correspond to any number of measuring device parameters.

In use, the machine control unit is turned on and initialized, whereupon the main user interface is displayed on the computer monitor. The user or operator then selects various icons as desired to perform measurement and inspection of an object to be measured by the coordinate measurement machine. For example, the user may first select one or more of the feature definition icons and enter the nominal definition for the selected feature. The user may then select one or more of the sensor handling icons to set the desired functionality and/or operation of the CMM's sensor. Next, the user may select one or more of the measuring device parameter icons to set the measuring device parameters. The user is then ready to select one or more of the feature measurement icons to instruct the CMM to measure and record the measurement of the selected feature. Finally, the user can select the one or more of the feature construction icons to instruct the control unit to perform the desired calculations for the selected features. The results of all measurements and calculations can be displayed, stored, and printed out.

It is to be understood that the embodiments herein described are merely illustrative of the principals of the present invention. Various modifications may be made by those skilled in the art without departing from the spirit or scope of the claims which follow. For example, it is foreseen that there can be an icon for each and every DMIS function whether known or created in the future.

What is claimed is:

1. A method for coordinate measurement and inspection for use in a coordinate measurement machine environment, comprising the steps of:

providing icons corresponding to underlying DMIS code;

selecting said icons in a desired sequence;

opening a DMIS command line window upon the selection of an icon to allow for changes to the underlying DMIS code; and performing coordinate measurement and inspection according to the step of selecting said icons in a desired sequence.

2. An improved method for coordinate measurement and inspection in use with a coordinate measurement machine having a sensor operable via a machine control unit, said improved method comprising the steps of:

providing icons corresponding to underlying DMIS code;

selecting said icons to execute a DMIS command corresponding to said underlying DMIS code;

opening a DMIS command line window upon the selection of an icon to allow for editing of the underlying DMIS code; and repeating the step of selecting until desired measurement and inspection is complete.

3. The method of claim 2 wherein the step of providing icons includes the step of:

providing a plurality of feature definition icons for allowing entry of nominal definitions of corresponding features.

4. The method of claim 2 wherein the step of providing icons includes the step of:

providing a plurality of feature measurement icons for allowing feature measurement of corresponding features.

5. The method of claim 2 wherein the step of providing icons includes the step of:

providing a plurality of feature construction icons for executing mathematical calculations of corresponding features.

6. The method of claim 2 wherein the step of providing icons includes the step of:

providing a plurality of sensor handling icons for allowing selection of corresponding sensor operations.

7. The method of claim 2 wherein the step of providing icons includes the step of:

providing a plurality of measuring device parameter icons for allowing selection of corresponding measuring device parameters.

8. A method for coordinate measurement and inspection for use in a coordinate measurement machine environment, comprising the steps of:

providing at least one of a plurality of feature definition icons corresponding to underlying DMIS code for allowing entry of nominal definitions of corresponding features, a plurality of feature measurement icons corresponding to underlying DMIS code for allowing feature measurement of corresponding features, a plurality of feature construction icons corresponding to underlying DMIS code for executing mathematical calculations of corresponding features, a plurality of sensor handling icons corresponding to underlying DMIS code for allowing selection of corresponding sensor operations, and a plurality of measuring device parameter icons corresponding to underlying DMIS code for allowing selection of corresponding measuring device parameters;

selecting said at least one of said icons in a desired sequence;

opening a DMIS command line window upon the selection of at least one of said icons to allow for editing of the underlying DMIS code; and performing coordinate measurement and inspection according to the step of selecting said at least one of said icons in a desired sequence.

* * * * *